Figure 11:
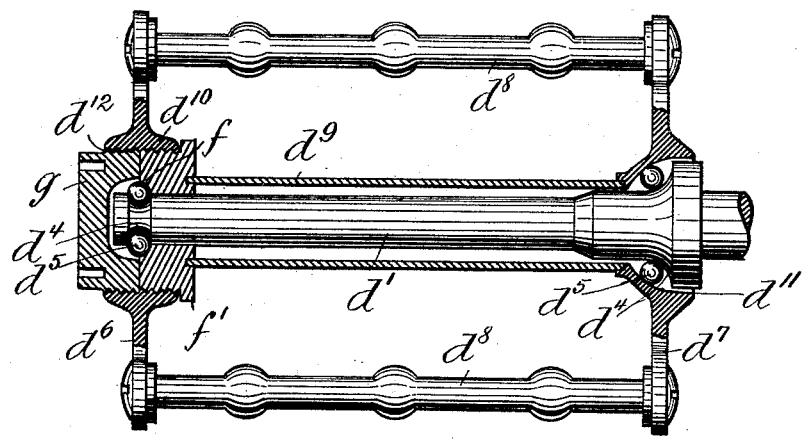

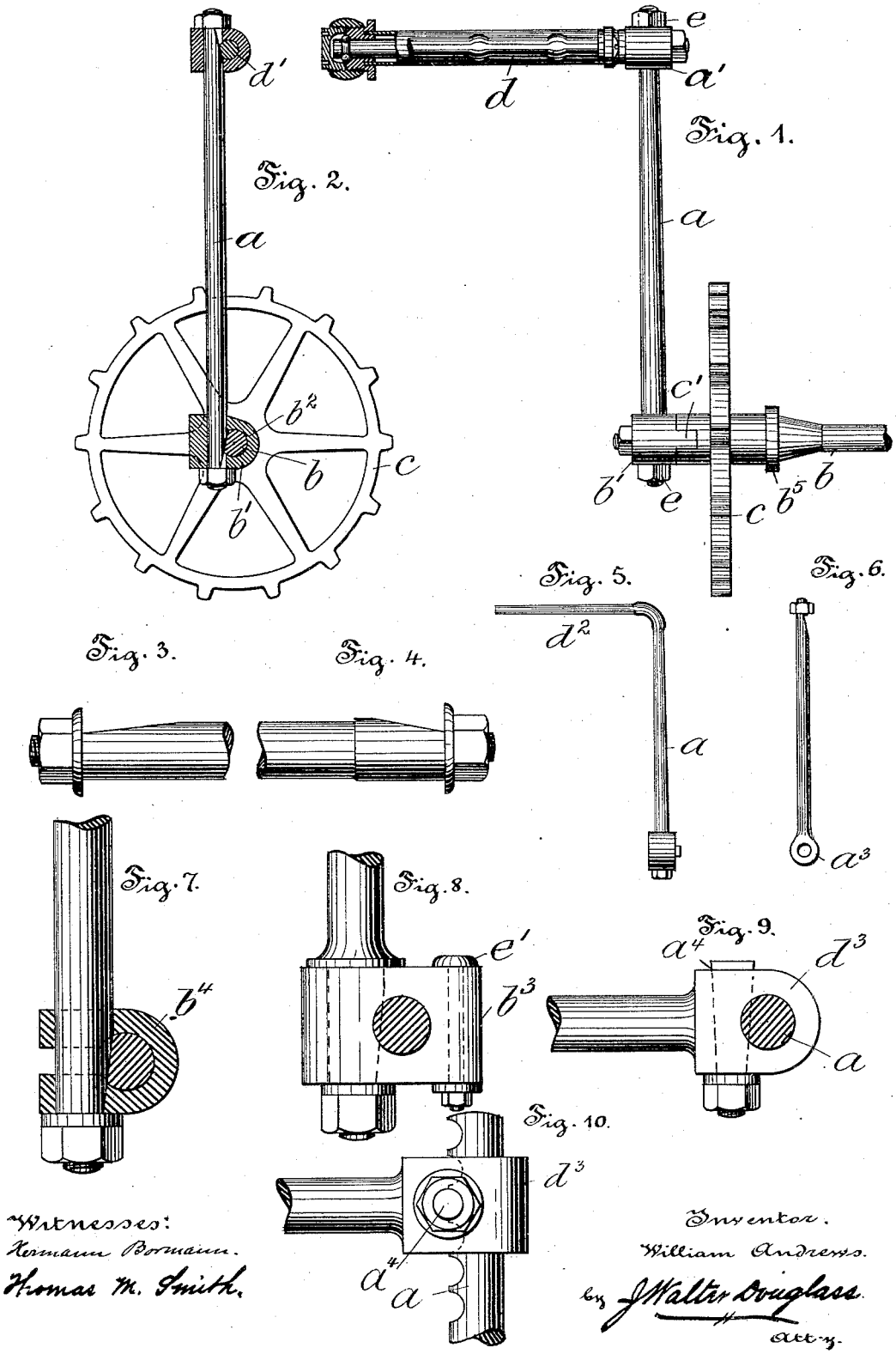

(No Model.) 2 Sheets—Sheet 2.

W. ANDREWS.
VELOCIPEDE.

No. 475,959. Patented May 31, 1892.

Witnesses:
Hermann Bormann.
Thomas M. Smith.

Inventor:
William Andrews
by J. Walter Douglass
atty.

UNITED STATES PATENT OFFICE.

WILLIAM ANDREWS, OF ASTON, NEAR BIRMINGHAM, ENGLAND.

VELOCIPEDE.

SPECIFICATION forming part of Letters Patent No. 475,959, dated May 31, 1892.

Application filed October 21, 1891. Serial No. 409,461. (No model.) Patented in England March 19, 1891, No. 4,905.

*To all whom it may concern:*

Be it known that I, WILLIAM ANDREWS, a subject of the Queen of England, residing at Aston, near Birmingham, in the county of Warwick, England, have invented certain new and useful Improvements in Velocipedes, (for which I have obtained Letters Patent in England, dated March 19, 1891, No. 4,905,) of which the following is a specification.

My invention has relation to velocipedes and is applicable in whole or in part to such vehicles in general, and particularly to improvements in the construction, arrangement, and operation of the pedal mechanism of such vehicles.

The principal objects of my present invention are, first, to provide simple, durable, comparatively inexpensive, and efficient pedal mechanism having the respective parts thereof arranged so that they may be readily disconnected and assembled; second, to provide means for permitting of the adjustment of the respective parts of such mechanism to compensate for wear; third, to unite the respective members of the mechanism in such manner that the same are properly held or locked to place when in use; fourth, to provide simple means for permitting of the adjustment of the pedals with reference to the axis of the driving-wheel; fifth, to construct and arrange the pedal mechanism in such manner that the driving-gear or sprocket means may be readily removed, and, sixth, to protect the bearings and running parts of the mechanism from dust and other extraneous matter.

Hitherto velocipedes have been provided with pedal mechanism comprising a pedal of the "ball" type, a gear-wheel keyed to an axle, and a crank-arm constructed of a single piece and provided at one extremity with a boss, which is bored out to fit onto the axle, and at the other extremity with an elongated hole or slot adapted to receive the crank-pin of the pedal.

In my invention use is made of pedal mechanism comprising a novel arrangement of adjustable cones for the ball-bearing of the pedal, a gear-wheel loose on the axle, and a crank built up or formed of two or more pieces detachably connected by separate metal bosses or couplings, one of which engages with grooves or projections formed on the hub of the gear-wheel.

My invention consists of pedal mechanism having a ball pedal, a pedal-plate provided with an internally-tapped aperture, and a cone-bearing and a locking-piece adapted for insertion into said aperture.

My invention further consists of pedal mechanism provided with a crank-arm comprising a lever and detachable bosses or couplings having intersecting perpendicular passages adapted for the reception of the lever and of the members, to which it is connected in such manner that the same are interlocked.

My invention further consists of pedal mechanism provided with a crank-boss fixed upon an axle and a driving-gear rotatably mounted on said axle and adapted to detachably engage said boss and to be slid off the axle; and my invention further consists of the improvements in pedal mechanism hereinafter described and claimed.

The nature and objects of my invention will be more fully understood from the following description, taken in connection with the accompanying drawings, forming part hereof, and in which—

Figure 12:
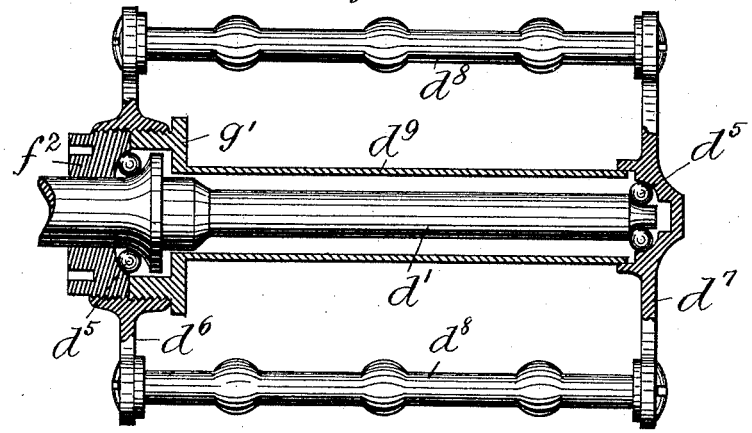
Figure 13:
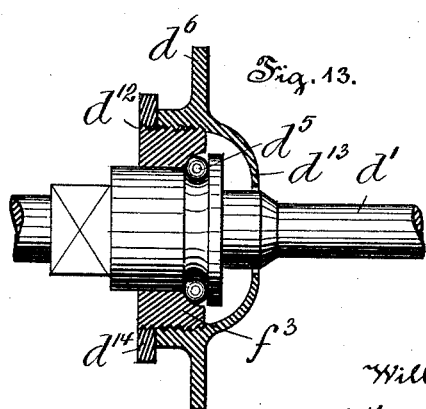

Figure 1 is a front elevation of velocipede-pedal mechanism embodying features of my invention and showing detachable couplings or bosses provided with perpendicular intersecting passages for the reception of the parts which they connect. Fig. 2 is a side view of the same. Figs. 3 and 4 are detached views showing the inclined extremities of the crank and of one of the members with which it is connected by means of the boss or collar, and also showing nuts for retaining said parts to place. Fig. 5 is a front view of a crank provided with a detachable axle-boss and having a pedal-pin integral therewith. Fig. 6 is a view of the lever of a crank provided at one end with an integral eye and having the other end scarfed or beveled for the reception of a coupling or boss. Figs. 7 and 8 illustrate collars or bosses embodying modifications of my invention. Figs. 9 and 10 are detached views showing a pedal-boss formed integral with the pedal-pin and secured to the lever by a taper-pin and lock-nut. Figs. 11 and 12 are plan views, partly in section, drawn to an enlarged scale, and illustrating the pedals; and Fig. 13 is a detail view illustrating a pedal-plate embodying a modification of my invention.

Referring now to the drawings, and more especially to Fig. 1, $a$ is a crank-arm, $b$ is an axle, $c$ is a driving gear or sprocket wheel, and $d$ is the ball-pedal, all hereinafter more fully described.

The crank comprises a lever $a$, formed of a single piece of metal of any required section and of a length to suit the maximum radius to be described by the pedal-pin $d'$.

$b'$ is an axle boss or coupling made of a separate piece of metal and provided with apertures or passages $b^2$, disposed perpendicular to and intersecting each other. One of these apertures $b^2$ admits one end of the axle $b$, and the other is adapted for the reception of one end of the aforesaid lever $a$. The pedal-boss $d^2$ is similarly made of a separate piece of metal provided with intersecting perpendicular apertures, one of which receives the pedal-pin $d'$ and the other admits the free end of the aforesaid lever $a$. The apertures or passages in the separate bosses or couplings preferably intersect each other slightly, so that the lever in passing through its aperture or opening intersects the axle $b$ at one end and the pedal-pin $d'$ at the other end, whereby the parts are firmly locked to place. Moreover, a portion of the axle $b$ or pedal-pin $d'$ is cut away or beveled to permit of the lever passing or sliding past and upon the same, whereby the parts are locked together.

The bosses or couplings $a'$ and $b'$ may be secured at any required position on the lever and axle by nuts $e$, Figs. 1 and 2, bolt $e'$, Fig. 8, or by other equivalent devices, as taper-pins. In some cases the pedal-pin may be screwed into one end of the lever or may be formed by bending over one end of the lever at right angles to its length, as at $d^2$ in Fig. 5, the other end of the lever being provided with an axle boss or coupling, as hereinbefore described. In other cases the pedal-pin is formed with an enlarged end or eye $d^3$, Figs. 9 and 10, into which the lever $a$ is fitted and secured to place by a taper-pin $a^4$, and the axle $b$ is then attached by a separate boss or coupling $b'$, as hereinbefore described. In some instances the lever $a$ of the crank is provided with an integral eye $a^3$, Fig. 6, adapted for the reception of the axle $b$, and the other end of the lever is scarfed for attachment to the pedal-pin $d'$ in the manner above described. These bosses or couplings $b'$ may be of any desired form. In some cases they are formed of solid blocks of metal, Figs. 1 and 2, with the apertures $b^2$, intersecting each other at right angles, drilled or shaped to accommodate the section of the parts which they receive. In other cases they are formed by split blocks $b^3$, Fig. 8, fastened together by a bolt $e'$ or by flat bands of metal $b^4$, bent into a U shape, Fig. 7; but in every case the lever $a$ is provided with one or more bosses, by means of which the crank is built up and attached to place.

$c$ is a gear or driving sprocket wheel mounted loose on the axle $b$ in contact with a flange $b^5$ and adapted to be slid off the axle $b$ over the end thereof. In order to cause the said gear to partake of the movements of the crank and axle, this gear $c$ is connected to the axle-boss $b'$ by causing a part $c'$ of the hub of the gear to engage with a corresponding part of the axle-boss $b'$.

$d'$, Figs. 11, 12, and 13, is a pedal-pin provided at or near the inner and outer ends thereof with a channel, groove, or abutment $d^4$, adapted to serve as a race for the steel balls $d^5$, commonly used in the construction of the so-called "pedal ball-bearings."

The end pieces or pedal-plates $d^6$ and $d^7$ are connected together by means of the pedal-treads $d^8$, which serve as distance-pieces to keep the end pieces or pedal-plates $d^6$ and $d^7$ the required distance apart. Preference is given to the employment of a tube $d^9$, inserted between the end plates $d^6$ and $d^7$, the object being to prevent the entrance of dust or other extraneous matter to the bearings. One of the aforesaid end plates $d^7$ is provided with a conical recess or bearing $d^{11}$ of usual construction; but the other end plate $d^6$ has the space usually occupied by the conical cavity entirely bored out, and the aperture $d^{12}$ thus formed is furnished with a screw-thread from end to end of the bore. This end plate $d^6$ is provided with a boss $d^{10}$ on one or both sides of the bore or aperture, so that the tapped aperture itself may be of any required length.

$f$ is a cone bearing provided with a milled head $f'$ and with an external screw-thread adapted to engage the tapped aperture $d^{12}$ in the end plate $d^6$. By screwing the cone bearing $f$ into or out of the aperture $d^{12}$ the adjustment may be effected of both the cone-bearings $f$ and $d^{11}$ in relation to the balls $d^5$ in the grooves $d^4$. The cone bearing $f$ enters into and occupies about half of the entire aperture $d^{12}$ in the end plate, and the other portion of the aperture $d^{12}$ accommodates a screw-plug $g$. This plug $g$ is provided with means for turning it by a spanner, screw-driver, or other suitable tool, and when screwed into the aperture $d^{12}$ in the end plate it advances until it meets and abuts against the cone bearing $f$, thus forming a lock or jam-nut and maintaining the adjustment of the cone-bearings. This plug $g$ and cone $f$ completely close the respective extremities of the apertures $a^{12}$ and exclude dust from the balls $d^5$ and race $d^4$. It may be remarked that the plate $d^6$, with its cone $f$ and plug $g$, may be located at the outer (Fig. 11) or inner (Fig. 12) end of the pedal-pin $d'$, the opposite end being slightly altered in form to suit the obvious requirements of the construction. For example, the conical bearing $f^2$ is located near the crank-arm and the screw-plug $g'$ is located between the bearing $f^2$ and the end of the pedal-pin.

The construction shown in Fig. 13 is the same as above described with reference to Figs. 11 and 12, with the following exceptions: The one end of the aperture is tapped, as before stated, and the other end forms a shield $d^{13}$ for the protection of the ball-bearing. Moreover, the cone bearing $f^3$ is screwed into the tapped end of the aperture $d^{12}$ and retained to place by a locking-plug or jam-nut $d^{14}$, engaging the cone bearing $f^3$ and abutting against the end plate $d^6$.

In the use of the hereinbefore-described pedal mechanism the parts of the pedal $d$ may be connected or fitted together in the following manner: The pedal-pin $d'$ is inserted into the pedal-tube $d^9$, the balls $d^5$ are mounted in the grooves $d^4$, and the adjustment is made for working or for compensating for wear by means of the cone $f$ and locking-plug $g$ in the manner hereinbefore described. The pedals may be adjusted with reference to the axle by causing the levers $a$ to extend a greater or less distance beyond the axle or pedal-bosses $a'$ or $b'$, or both, and the driving-gear or sprocket $c$ may be removed and repaired by simply disconnecting the crank with the tools usually carried by cyclists.

It may be remarked that the hereinbefore-described gear-wheel $c$ may be employed in connection with an ordinary crank instead of a built-up crank.

Having thus described the nature and objects of my invention, what I claim as new, and desire to secure by Letters Patent, is—

1. Pedal mechanism for velocipedes, provided with a ball-pedal, a pedal-plate having a tapped aperture, a cone bearing engaging said aperture, and a jam-nut for locking the cone bearing, substantially as and for the purposes set forth.

2. Pedal mechanism for velocipedes, provided with a crank-arm comprising a lever having a scarfed extermity and a detachable boss or coupling having intersecting passages adapted for the reception of the scarfed extremities of the lever and of the member to which it is attached, the construction being such that the scarfed extremities are interlocked in the coupling, substantially as and for the purposes set forth.

3. Pedal mechanism for velocipedes, provided with a flanged axle, a crank-boss detachably keyed to the end of the axle, and a driving sprocket or gear wheel loosely mounted on said axle intermediate of the flange and boss and adapted to detachably engage projections on said boss and to be slid off the axle, substantially as and for the purposes set forth.

4. Pedal mechanism for velocipedes, provided with a crank-lever, an axle, and a pedal-pin and having bosses or couplings provided with intersecting passages for the reception of the beveled or scarfed extremities of said lever, axle, and pin, substantially as and for the purposes set forth.

In testimony whereof I have hereunder signed my name in the presence of two subscribing witnesses.

WILLIAM ANDREWS.

Witnesses:
 ALFRED WM. TURNER,
 T. E. WILKINSON.